(No Model.)
A. Y. REEDER.
MEASURING APPARATUS.
No. 534,082. Patented Feb. 12, 1895.
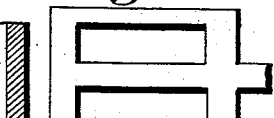
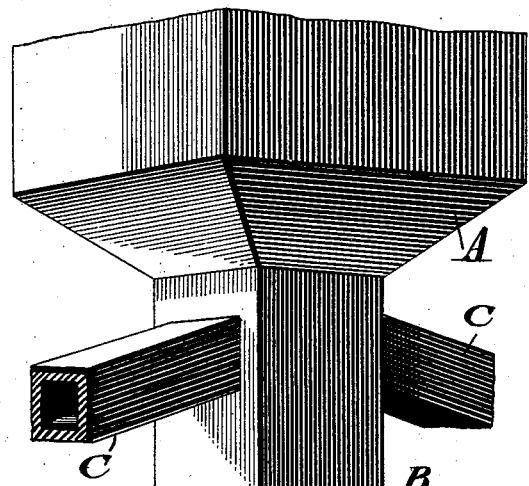
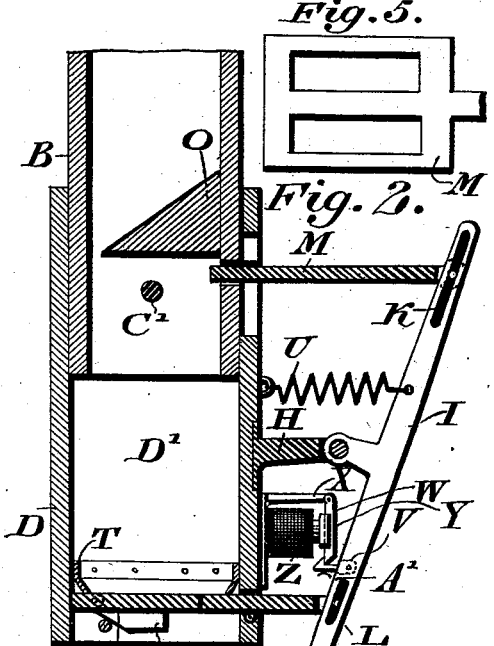
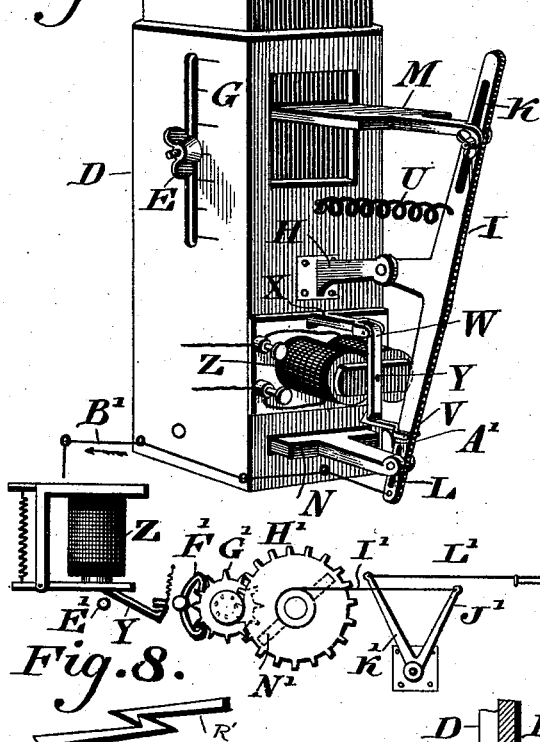
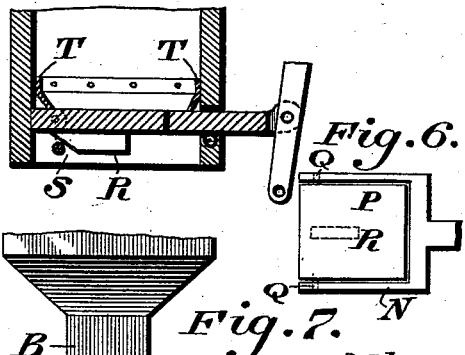
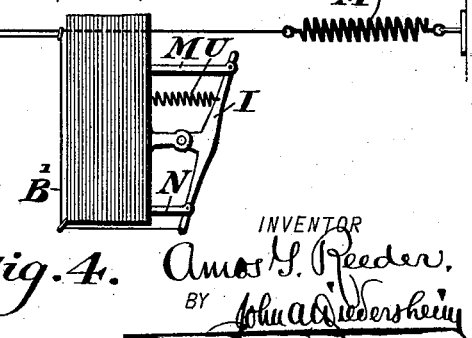
WITNESSES:
P. H. Nagle.
L. Douville.
INVENTOR
Amos Y. Reeder.
BY John A. Wiedersheim
ATTORNEY.

UNITED STATES PATENT OFFICE.

AMOS Y. REEDER, OF PHILADELPHIA, PENNSYLVANIA.

MEASURING APPARATUS.

SPECIFICATION forming part of Letters Patent No. 534,082, dated February 12, 1895.

Application filed March 14, 1894. Serial No. 503,547. (No model.)

*To all whom it may concern:*

Be it known that I, AMOS Y. REEDER, a citizen of the United States, residing in the city and county of Philadelphia, State of Pennsylvania, have invented a new and useful Improvement in Measuring Apparatus, which improvement is fully set forth in the following specification and accompanying drawings.

The object of my invention is to construct a device which at proper intervals, at the will of the operator, admits of a predetermined quantity of material to be deposited at any desired point, as will be hereinafter set forth.

The device is especially adapted to be employed in stables for feeding horses.

Figure 1 represents a perspective view of a measuring apparatus embodying my invention. Fig. 2 represents a vertical sectional view of the operative parts of the same. Fig. 3 represents a sectional view of a detail. Fig. 4 represents a detail view of an adjusting device. Figs. 5 and 6 represent plan views of the top and bottom cut-offs, respectively. Fig. 7 represents a view of the connections when the device is arranged to work in series. Fig. 8 represents a modification hereinafter described.

Similar letters of reference indicate corresponding parts in the several figures.

Referring to the drawings: A designates a hopper into which the material to be measured is placed.

B designates a vertical conduit leading therefrom, and C designates conduits from which may depend other vertical tubes or conduits.

The conduit B telescopes in the tube D, and is held at the desired position by means of the thumb-screw E, which engages the bolt F, as shown in Fig. 4.

G designates a graduated scale for adjusting the distance between the cut-offs. A bracket H is attached to the tube D, to which is pivoted the rock-arm I, slotted at K and L, at which points are connected the sliding gates or cut-offs M and N. The cut-off M is recessed as shown in Fig. 5, so that there is less liability of grain getting lodged between the valve, and the block O which obstructs the passage so that the outlet is to one side of the said block. The cut-off N is made in two pieces, the inner piece P being pivoted at Q, and having on the under side a rib R, which rides on the pin S, so that when the gate is in the position in Fig. 3, the pin S being on the rib, will keep the pivoted piece P horizontal.

T designates guides which serve to keep the material in the tube out of the corners.

U designates a spring which tends to pull the upper part of the arm I in toward the tube D, which tendency is resisted by the pivoted hook or latch V, which is secured to the arm I, and engages with the arm W, which is pivoted to the bracket X.

Y designates an armature of soft iron, which is attached to the arm W.

Z designates a pair of electro magnets adapted to attract the armature Y when the circuit is closed, and hold it as shown. The magnets may be arranged vertically or horizontally, so as to set the device in operation in either closed or open circuit.

A' designates a spring adapted to hold the latch V in the position shown.

B' designates a cord or wire attached to the end of the arm I, and is for setting the device.

C' designates a pin adapted to support the cut-off M. The part C' may be extended through the tube B for this purpose. By adjusting the tube B vertically by means of the scale G and thumb-screw E, the capacity of the measuring chamber D' can be varied.

The operation is as follows: Suppose the parts to be in the position shown in Fig. 2, the vertical chamber between the two valves is filled with the material to be measured. The circuit being closed, the armature Y is held by the attraction of the magnets, and the spring A' holds the latch V as shown. When the operator breaks the circuit the armature is released. Spring U draws the cut-off M in and N out, the cut-off N needing to move but a short distance as compared to the movement of the cut-off M, since all that is necessary to dump the piece P is to move the rib R away from the pin S. The operator then closes the circuit again, and pulls the string in the direction of the arrow, and the parts assume the position in Fig. 2 again.

In practice I may vary the shape of the arm I, making the upper and lower portions thereof at such an angle to each other, and connecting their extremities to the cut-offs in such a way, that when the lower portion is vertical or parallel to the chute, it will indicate that the device has not operated and that the lower cut-off is closed, provision being made for the requisite movement of the cut-offs, a slight movement only being necessary to dump the lower piece, while a greater extent of movement is necessary to properly operate the cut-off, as is evident.

Fig. 7 represents a device arranged to work in series. Z designates the electro magnets and Y the armature. E' is a stop for limiting the movement of the armature, and F', G' and H' designate a device similar to a clock escapement. I' is a cord attached to H' at one end, and at the other to one arm J' of the bell crank, while to the arm K' is attached the cord L' leading to the spring M'. The cord B' and the other parts M, N, U and I, and their manner of operation are substantially the same as have been hereinbefore described, except that instead of a magnet for each individual measuring device, one magnet for the series is sufficient. N' designates a key for winding up the escapement device which pulls the cords L' and B' tight.

The operation is as follows: When the circuit is broken as before, the armature Y drops to pin E', and the spring M' exerts a pull on the main line, slacking the same and allowing the spring U to pull the cut-off M in and the cut-off N out.

In Fig. 8 is shown the arms R', having engaging ratchet teeth, said arms being adapted to be substituted for the escapement device shown in Fig. 7.

Having thus described my invention, what I claim as new, and desire to secure by Letters Patent, is—

1. In a measuring device, the combination of a tube for holding the material to be measured, two cut-offs working therein, a rock arm connected to said cut-offs, a spring U attached to said rock arm, electro magnets arranged adjacent to the latter, and locking mechanism interposed between said magnets and rock arm whereby a change in the electric circuit, causes a change in the positions of the cut offs and a resetting device, said parts being combined substantially as described.

2. A tube, two cut-offs working therein, a rock arm attached to said cut offs, the spring U, the pivotally mounted latch V, supported by the spring A', the electro magnet Z having the locking mechanism actuated thereby when any change is made in the electric circuit, and resetting device, said parts being combined substantially as described.

3. In a measuring device, a conduit with a gate having apertures therein, a tube adjustable relatively to said conduit and having a gate provided with a pivoted piece therein, a rock arm pivotally connected with said gates, a latch connected with one limb of said rock arm, means for engaging said latch, and a contractile spring connected with the tube and to the other limb of said arm, said parts being combined substantially as described.

4. In combination, a tube adapted to telescope in another, a block O having the opening to one side of the center, the gate M under said block and perforated as shown, a second gate below, means for regulating the distance between the gates, and means for actuating the gates, substantially as described.

5. In combination, a tube, a sliding gate working therein, having the piece P, pivoted as shown, and provided with the rib R on the under side, in combination with the pin S and means for reciprocating said gate whereby a slight lateral movement of the latter will cause the material to be deposited, substantially as described.

6. In combination, a tube, a gate working therein, having the part P pivoted as shown, and provided with the rib R underneath, in combination with guides T, within said tube and above said gate the pin S and means for actuating said gate, substantially as described.

7. In a measuring apparatus, a conduit having an obstructing block therein, an apertured cut-off below said block, a tube telescopically connected with said conduit, a cut-off in said tube having a pivoted inner portion, a rock arm connecting said cut-offs, and means for operating said arm, said parts being combined substantially as described.

8. In a measuring apparatus, a conduit, a cut-off in said conduit, a tube telescopically connected with said conduit a cut-off in said tube, a rocking arm connecting said cut-offs a spring connected to one of the limbs of said rocking arm and to said tube, a latch connected with the other limb, and an electric circuit with a magnet and armature for engaging said latch, said parts being combined substantially as described.

9. In a measuring device, two gates, one above the other, working in a tube, a pivoted rod connecting them, the spring U, elector magnets Z, arm W connected to the armature, the latch V engaging the same, a connection leading from the magnets, whereby when the electrical circuit is changed the gates will be moved, substantially as described.

10. In a measuring device, two gates one above the other working in a tube, a pivoted rod connecting them, the spring U, electro magnets Z, arm W connected to the armature, the latch V engaging the same, the spring A' and cord B', whereby when the circuit is broken, the gates are moved, substantially as described.

AMOS Y. REEDER.

Witnesses:
JOHN A. WIEDERSHEIM,
R. H. GRAESER.